US008571932B2

(12) United States Patent
Sharma

(10) Patent No.: US 8,571,932 B2
(45) Date of Patent: Oct. 29, 2013

(54) USING SEARCH QUERY INFORMATION TO DETERMINE RELEVANT ADS FOR A LANDING PAGE OF AN AD

(75) Inventor: Jayesh Sharma, San Francisco, CA (US)

(73) Assignee: Google Inc., Mountain View, CA (US)

(*) Notice: Subject to any disclaimer, the term of this patent is extended or adjusted under 35 U.S.C. 154(b) by 1318 days.

(21) Appl. No.: 11/323,303

(22) Filed: Dec. 30, 2005

(65) Prior Publication Data

US 2007/0156520 A1     Jul. 5, 2007

(51) Int. Cl.
*G06Q 30/00*     (2012.01)
(52) U.S. Cl.
USPC .................... 705/14.54; 705/14.4; 705/14.49
(58) Field of Classification Search
USPC .................................. 705/14.54, 14.49, 14.4
See application file for complete search history.

(56) References Cited

U.S. PATENT DOCUMENTS

| 7,136,875 | B2* | 11/2006 | Anderson et al. ..................... 1/1 |
| 2002/0004759 | A1* | 1/2002 | Bradford et al. ................ 705/26 |
| 2003/0046161 | A1* | 3/2003 | Kamangar et al. ............. 705/14 |
| 2004/0093327 | A1 | 5/2004 | Anderson et al. |
| 2005/0033641 | A1* | 2/2005 | Jha et al. ......................... 705/14 |
| 2005/0222900 | A1* | 10/2005 | Fuloria et al. ................... 705/14 |

OTHER PUBLICATIONS

PCT/ISA/220, "Notification of Transmittal of the International Search Report and the Written Opinion of the International Searching Authority, or the Declaration" for PCT/US06/49213, mailed Sep. 25, 2007 (1 pg.).
PCT/ISA/210, "International Search Report" for PCT/US06/49213, mailed Sep. 25, 2007 (2 pgs.).
PCT/ISA/237, "Written Opinion of the International Searching Authority" PCT/US06/49213, mailed Sep. 25, 2007 (4 pgs.).
U.S. Appl. No. 12/124,425, filed May 21, 2008, Kniaz, et al.
Examiner's First Report for Australian Patent Application No. 2006332823, mailed Nov. 10, 2009 (3 pgs.).
Notice of Preliminary Rejection for Korean Patent Application No. 10-2008-7018783, mailed Jun. 30, 2010 (5 pgs.) with translation (5 pgs.).
Notice of Preliminary Rejection for Korean Patent Application No. 10-2011-7023254, mailed Mar. 23, 2012 (5 pgs.) with translation (6 pgs.).
Notice of Final Rejection for Korean Patent Application No. 10-2008-7018783, mailed May 31, 2011 (5 pgs.) with translation (4 pgs.).
Examiner's Report for Canadian Patent Application No. 2,635,750, mailed Aug. 13, 2013 (3 pgs.).

\* cited by examiner

*Primary Examiner* — John Van Bramer
(74) *Attorney, Agent, or Firm* — John C. Pokotylo; Straub & Pokotylo

(57) ABSTRACT

Advertisers can generate revenue (or credits) from an advertising network by allowing relevant ads to be shown with their properties (e.g., a document such as a Web page), and allow an ad delivery system to serve relevant ads. For example, the advertiser document may include at least one supplemental advertisement determined using search query information entered earlier by a user device. As another example, the advertiser document may include at least one supplemental advertisement determined using a correlation or association of the advertiser's advertisement and the supplemental advertisement.

23 Claims, 6 Drawing Sheets

USING SEARCH QUERY INFORMATION TO DETERMINE RELEVANT ADS FOR A LANDING PAGE OF AN AD

§1. BACKGROUND OF THE INVENTION

§1.1 Field of the Invention

The present invention concerns advertising, such as online advertising for example. In particular, the present invention concerns serving relevant advertisements.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. Nos. 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular. Moreover, advertising using other targeting techniques, and even untargeted online advertising, has become increasingly popular.

Existing advertising systems could be improved. For example, it would be useful to extend opportunities to provide end users with relevant ads, and to allow advertisers to generate revenue (or credits) from an advertising network for allowing ads to be shown with their properties, such as documents in general and Web pages in particular.

§2. SUMMARY OF THE INVENTION

Embodiments consistent with the present invention may allow advertisers to generate revenue (or credits) from an advertising network by allowing relevant ads to be shown with their properties, and allow an ad delivery system to serve relevant ads. For example, embodiments consistent with the present invention may do so by (a) accepting search query information sourced from a user device, (b) generating, for presentation on the user device, a document (e.g., a Web page) with search results determined using the search query information and an advertisement(s) determined using the search query information, wherein each advertisement(s) includes a reference to an advertiser document, (c) accepting a selection, sourced from the user device, of (one of) the advertisement(s), and (d) generating, for presentation on the user device, the advertiser document referenced from the selected advertisement, wherein the advertiser document includes at least one supplemental advertisement determined using the search query information. Other embodiments consistent with the present invention may do so by (a) generating, for presentation on a user device, a document with at least one advertisement, wherein each of the advertisement(s) includes a reference to an advertiser document, (b) accepting a selection, sourced from the user device, of (one of) the advertisement(s), and (c) generating, for presentation on the user device, the advertiser document referenced from the selected advertisement(s), wherein the advertiser document includes at least one supplemental advertisement determined using a correlation or association of the selected advertisement and the supplemental advertisement.

§3. BRIEF DESCRIPTION OF THE DRAWINGS

§4. DETAILED DESCRIPTION

Figure 1:
FIG. 1 is a diagram showing parties or entities that can interact with an advertising system.

The present invention may involve novel methods, apparatus, message formats, and/or data structures for allowing advertisers to generate revenue (or credits) from an advertising network by allowing relevant ads to be shown with their properties, and allowing an ad delivery system to serve relevant ads. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, a specific example illustrating the utility of one exemplary embodiment of the present invention is provided in §4.4. Finally, some conclusions regarding the present invention are set forth in §4.5.

§4.1 DEFINITIONS

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Adobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 EXEMPLARY ADVERTISING ENVIRONMENTS IN WHICH, OR WITH WHICH, THE PRESENT INVENTION MAY OPERATE

FIG. 1 is a diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user). Each ad may also include a link to a URL (e.g., a landing Web page, such as the home page of an advertiser, or a Web page associated with a particular product or server). Naturally, the ad information may include more or less information, and may be organized in a number of different ways.

Figure 2:
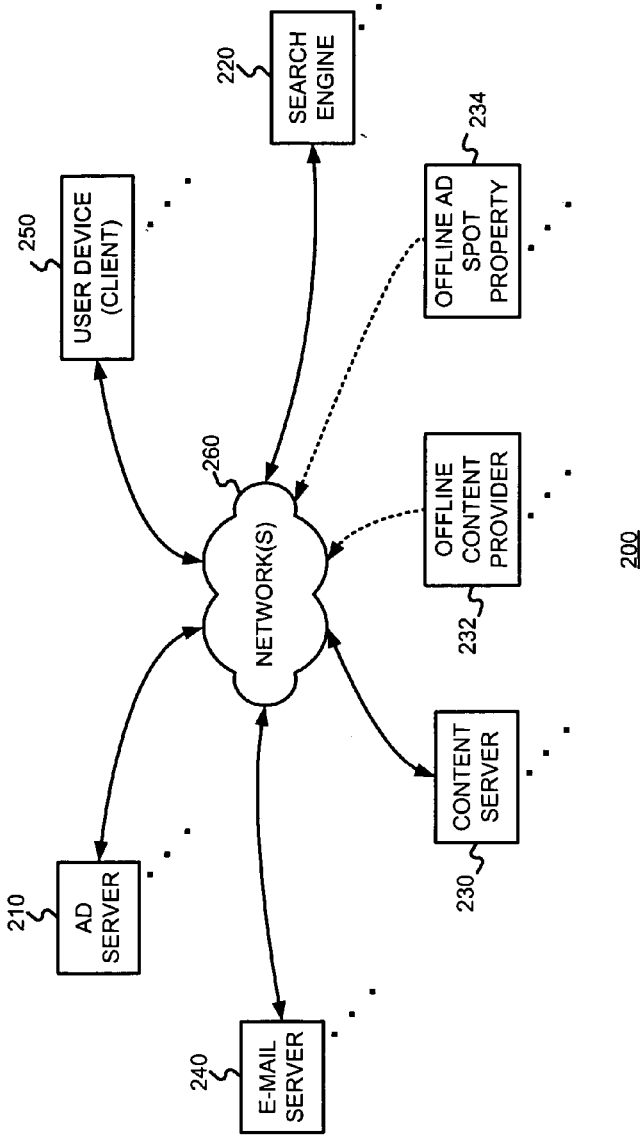
FIG. 2 is a diagram illustrating an environment in which, or with which, embodiments consistent with the present invention may operate.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), etc. A search engine 220 may permit user devices 250 to search collections of documents (e.g., Web pages). A content server 310 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

The offline content provider 232 may provide information about ad spots in an upcoming publication, and perhaps the publication (e.g., the content or topics or concepts of the content), to the ad server 210. In response, the ad server 210 may provide a set of ads relevant the content of the publication for at least some of the ad spots. Examples of offline content providers 232 include, for example, magazine publishers, newspaper publishers, book publishers, offline music publishers, offline video game publishers, a theatrical production, a concert, a sports event, etc.

Owners of the offline ad spot properties 234 may provide information about ad spots in their offline property (e.g., a stadium scoreboard banner ad for an NBA game in San Antonio, Tex.). In response, the ad sever may provide a set of ads relevant to the property for at least some of the ad spots. Examples of offline properties 234 include, for example, a billboard, a stadium score board, and outfield wall, the side of truck trailer, etc.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 EXEMPLARY EMBODIMENTS

Figure 3:
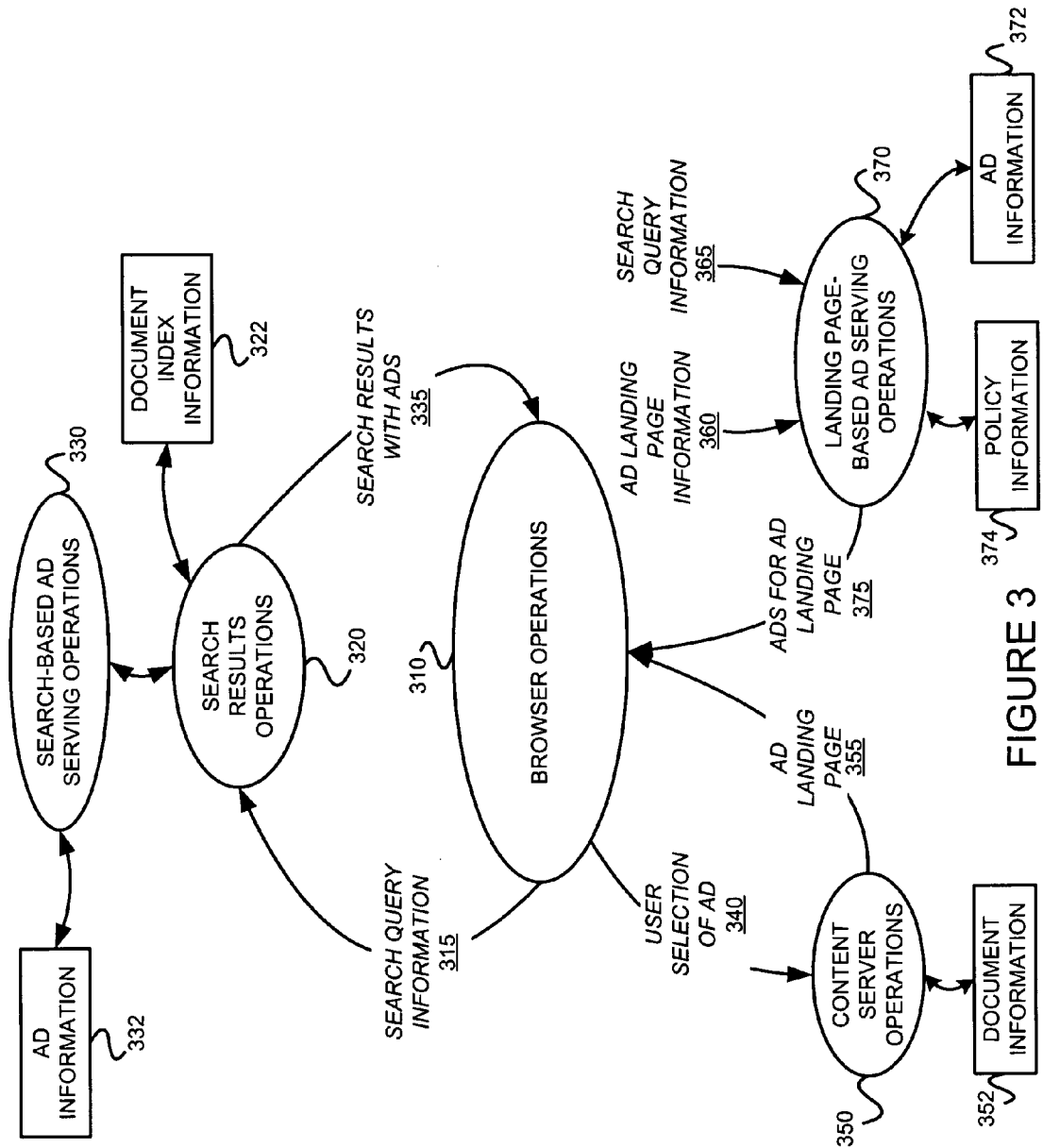
FIG. 3 is a bubble diagram of exemplary operations that may be performed in a manner consistent with the present invention, as well as information that may be used and/or generated by such operations.

FIG. 3 is a bubble diagram of exemplary operations that may be performed in a manner consistent with the present invention, as well as information that may be used and/or generated by such operations. The operations may include browser operations 310, search results operations 320, search-based ad serving operations 330, content server operations 350, and landing page-based ad serving operations 370. The information may include document index information 322, ad information 332, document information 352, ad information 372 (which may include at least some of, or all of ad information 332), and policy information 374.

Via browser operations 310, a user may submit search query information 315 to search results operations 320. For example, an Internet browser (e.g., Explorer, Navigator, Firefox, Opera, etc.) may load a search engine Web page (such as that found at www.google.com), and a user may enter a search query. The browser will then submit the search query to an Internet search engine.

The search results operations 320 may use document index information 322 to generate search results. These operations 320 may also pass search query information to search-based ad serving operations 330. Using the search query information, the search-based as serving operations 330 may determine one or more relevant advertisements using ad information 332, and may pass information about these ads back to the search results operations 320. These operations 320 may then provide a document including the search results and ads 335 back to the browser operations 310. For example, the Google search engine may determine search results and relevant ads from its AdWords advertising network. It may then generate a Webpage including the search results and the ads to be loaded into the user's Internet browser.

The ads may include elements (e.g., a hypertext link) which allow users to select the ad, upon which selection 340, content server operations 350 obtain a linked document (e.g., an ad's landing Webpage) 355 from document information 352. The linked document may be loaded into the browser for presentation to the user.

Landing page based ad serving operations 370 may use search query information 365 and ad information 372 to determine ads for the ad landing page 375. The search query information 365 may be provided from a "referrer field" of the Webpage URL for example. The operations 370 may also use ad landing page information 360 such as topics or concepts determined by analyzing the landing page for example, and/or policy information 374. The policy information may be provided by the advertiser associated with the ad landing page and may include, for example, one or more of competitor filters, competing product and/or service filters, advertiser specified keywords, categories, and/or concepts. Such information may be logically ANDed with the search query information, etc.

The ad landing page 355 and the ads for the landing page 375 may be combined (e.g., by the content server operations 352, the landing page based ad serving operations 370 and/or the browser operations 310) for presentation to the user via the browser.

§4.3.1 Exemplary Methods

Figure 4:
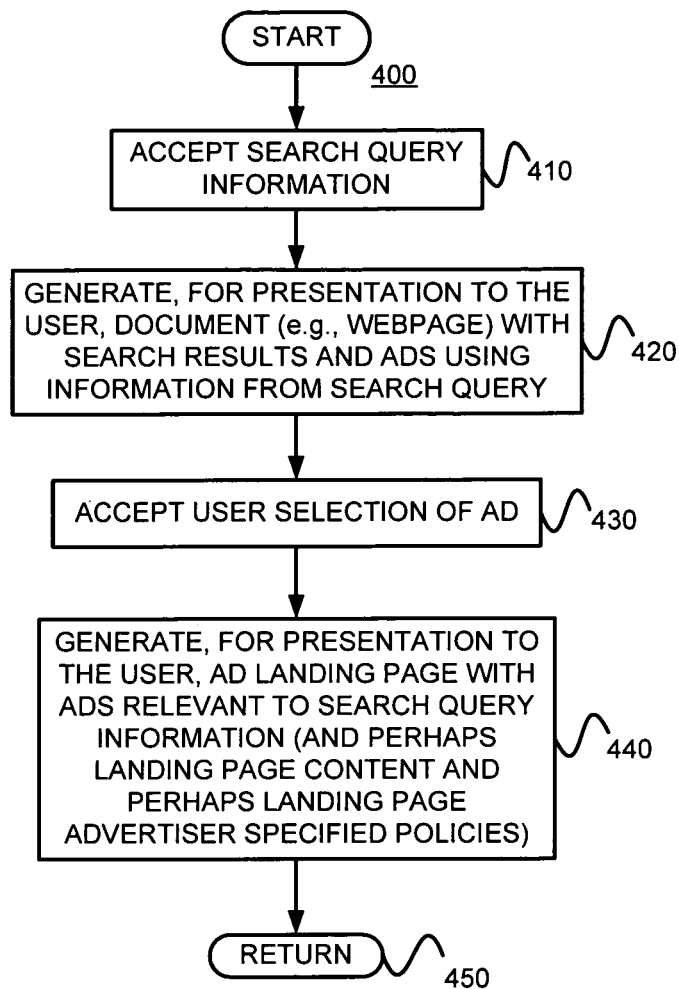
FIG. 4 is a flow diagram of an exemplary method for determining relevant ads to be served with an advertiser's landing page in a manner consistent with the present invention.

FIG. 4 is a flow diagram of an exemplary method 400 for determining relevant ads to be served with an advertiser's landing page in a manner consistent with the present invention. Search query information is accepted (Block 410) and a document (e.g., a Webpage) with search results and ads relevant to the search query is generated for presentation to the user that submitted the search query (Block 420). A user selection of one of the ads is accepted. (Block 430) In response, an ad landing page with ads relevant to the search query information is generated for presentation to the user (Block 440) before the method 400 is left (Node 450). Still referring to block 440, the ads may also be relevant to content of the landing page, and/or may be subject to landing page policies.

§4.3.2 Exemplary Apparatus

Figure 8:
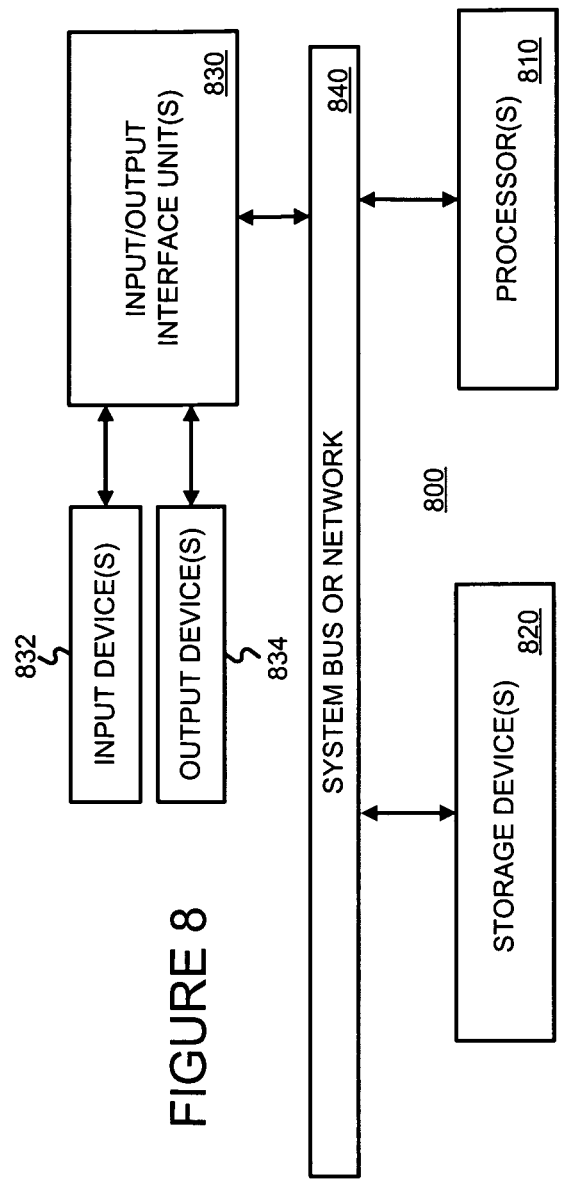
FIG. 8 is a block diagram of apparatus that may be used to perform at least some operations, and store at least some information, in a manner consistent with the present invention.

FIG. 8 is a block diagram of apparatus 800 that may be used to perform at least some operations, and store at least some information, in a manner consistent with the present invention. The apparatus 800 basically includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 820 and/or may be received from an external source via one or more input interface units 830.

In one embodiment, the machine 800 may be one or more conventional personal computers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other (peripheral) output devices (not shown), such as speakers and printers for example.

Referring back to FIG. 2, one or more machines 800 may be used as end user client devices 250, content servers 230, search engines 220, email servers 240, and/or ad servers 210.

§4.3.3 Refinements and Alternatives

Referring back to FIG. 3, search query information 365 is provided to landing page based ad serving operations 370. Such information 365 may be provided in a number of ways. For example, in at least some embodiments consistent with the present invention, the "referrer" field of the URL of the search results Webpage may provide search query information 365. In at least some other embodiments consistent with the present invention, the browser operations 310 and/or search results operations 320 may provide search query information 365.

Referring back to FIG. 3, the advertiser may provide policy information 374. In at least some embodiments consistent with the present invention, the policy information 374 may include one or more of: (i) competitor ads to be blocked (as defined by landing page of the ad, creative of the ad, etc.); (ii) competing products and/or services to be blocked; (iii) conditions precedent to serving ads (e.g., only after checkout, only after order placed, etc.); (iv) limiting ads to specific products and/or services (e.g., by logical AND with specified keywords and/or topics); (v) impression only ads (e.g., ads without links to landing pages), etc.

Although some of the embodiments used search query information to determine ads to be provided on the landing page of a selected ad, this is not necessary. For example, the advertiser associated with the ad landing page may select categories or concepts for use in targeting ads to their ad landing page. As another example, an advertising network may determine, automatically, ad-to-ad correlations (e.g., ads for Nike running sneakers and ads for Gatorade drinks), ad category-to-ad category correlations (e.g., ads for luxury cars and ads for luxury watches), product-to-service correlations (e.g., ads for digital cameras and ads for online photo developing), product-to-supplemental product correlations (e.g., ads for printers and ads for printer paper), service-to-service correlations (e.g., ads for hotels and ads for car rentals), service-to-product correlations (e.g., ads for trips to Colorado and ads for skiing equipment), etc. Such correlations may be based on past ad selections by users during online sessions, past purchases or conversions by users during online sessions, past search queries submitted by users during online sessions, etc. Alternatively, or in addition to correlations, associations (e.g., product-product, service-service, product-service, service-product, etc.) may be defined manually. Such correlations and/or associations may be presented to the advertiser for approval, or may be used without advertiser approval, or absent advertiser disapproval. Such information may be used instead of, or in addition to, search query information.

At least some embodiments consistent with the present invention may allow the advertiser to control the extent of showing secondary ads on their ad landing page, and/or how such secondary ads are determined. Results in terms of conversions, advertising revenue, etc. may be tracked. In this way, advertisers can experiment with such secondary advertising to observe effects of secondary advertising on advertising revenue, conversions, lost conversions, etc. Using these observations, the advertiser can then adjust the extend of showing secondary ads on their ad landing page and/or how such secondary ads are determined.

An advertiser may be compensated for showing secondary ads on their ad landing page. Such compensation may be in the form of a direct payment, or a credit. Alternatively, or in addition, such compensation may be in the form of an increase in the score of their ad relative to other ads competing to be shown on the search results document.

§4.4 EXAMPLES OF OPERATIONS

Figure 5:
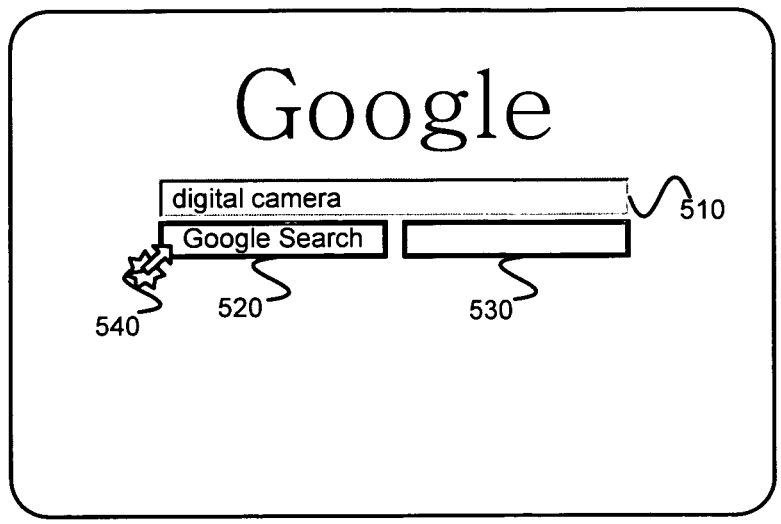
FIGS. 5-7 illustrate an example of operations of an exemplary embodiment consistent with the present invention.
Figure 6:
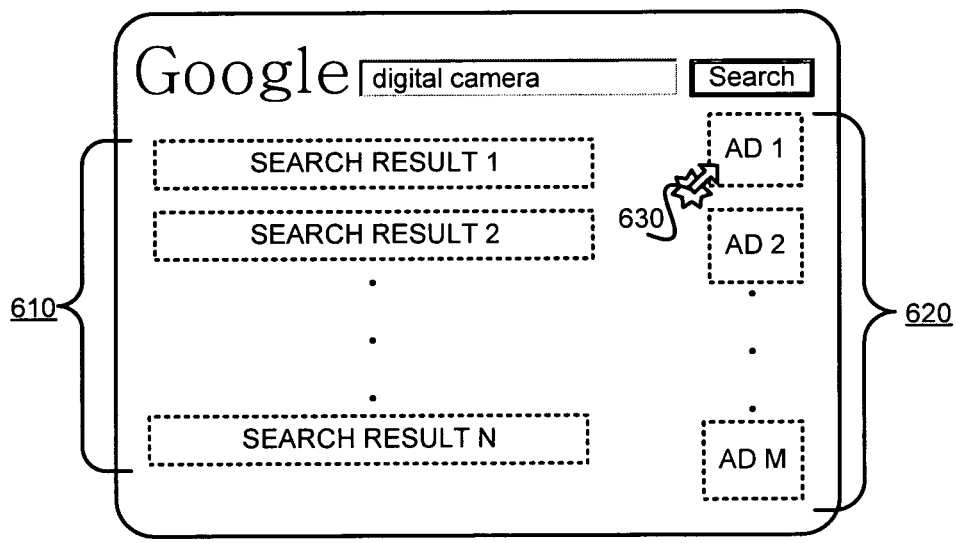
Figure 7:
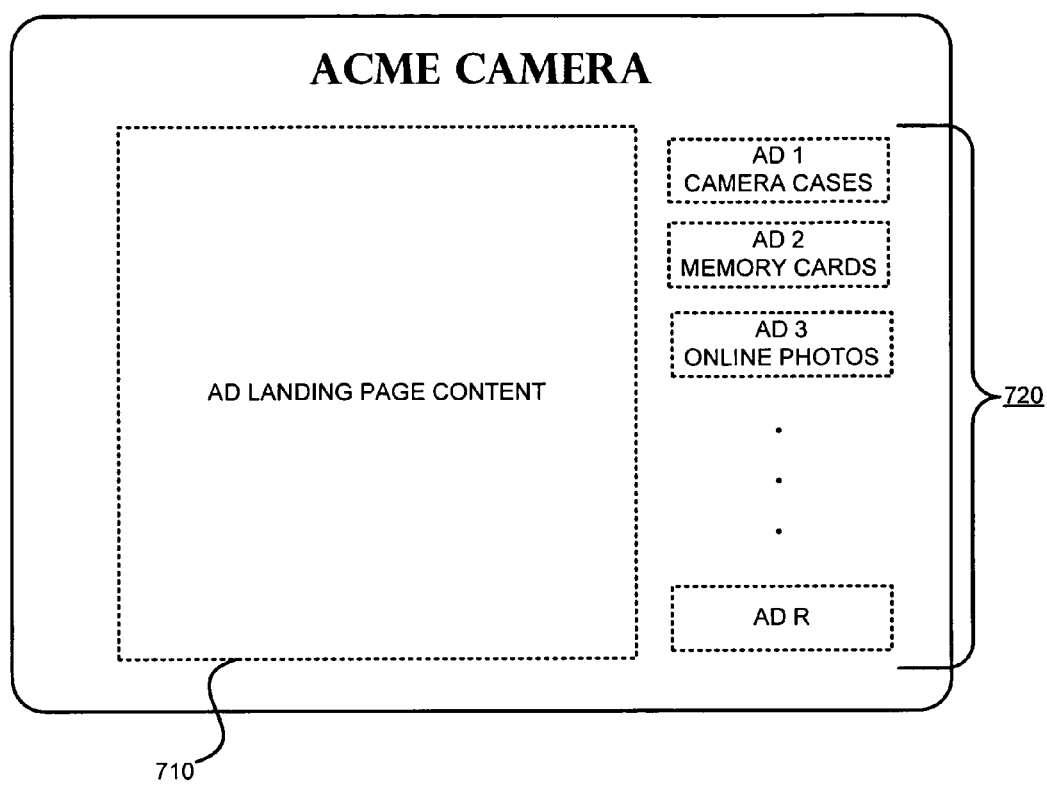

FIGS. 5-7 illustrate an example of operations of an exemplary embodiment consistent with the present invention. FIG. 5 illustrates an exemplary search engine Web page 500. A user has entered the search query "digital camera" in text box 510 and has selected, as indicated by click 540, search button 520.

FIG. 6 illustrates an exemplary Web page 600 including search results 610 and one or more ads 620. A user has selected, as indicated by click 630, ad 1.

Ad 1 includes a reference (e.g., a hypertext link) to a landing Web page. FIG. 7 illustrates an exemplary landing Web page 700. It 700 includes content 710 and additional ads 720. The ads 720 may be selected using, at least, search information (e.g., the original search query—"digital camera"). The ads may also be selected using topics determined by analyzing the content 710. The ads may also be selected using policies provided by the advertiser associated with ad landing Web page 700 and ad 1 of Web page 600. In this example, the advertiser may have listed competing camera retailers to block, and/or may have specified a list of acceptable keywords or categories (e.g., cases, memory cards, photograph development services, etc.).

As the foregoing example illustrates, the advertiser can advantageously generate revenue (and/or credits) by providing relevant advertising. The advertiser can use policies to avoid showing ads of competitors or ads that might influence an end user to shop elsewhere, and to show complementary products and/or services. End users are provided with relevant ads. The advertising network is provided with additional opportunities to serve relevant ads.

§4.5 CONCLUSIONS

As can be appreciated from the foregoing, embodiments consistent with the present invention can be used to improve existing advertising systems. For example, embodiments consistent with the present invention may be used to extend opportunities to provide end users with relevant ads, and to allow advertisers to generate revenue (or credits) from an advertising network for allowing ads to be shown with their properties, such as documents in general and Web pages in particular.

What is claimed is:

1. A computer-implemented method for determining at least one supplemental advertisement to be presented on an advertiser landing Web page, the advertiser landing page being referenced from a user selected advertisement, comprising:

a) accepting, by a computer system including one or more computers on a network, advertiser policies provided by an advertiser associated with the advertiser landing Web page, the advertiser policies including
  1) a condition that supplemental advertisements on the advertiser landing page must not include any links to another document, and
  2) a condition that supplemental advertisements on the advertiser landing page advertise a different product or service than the product or service advertised in the user selected advertisement;

b) accepting, by the computer system, search query information sourced from a user device;

c) generating, by the computer system and for presentation on the user device, a document with search results determined using the search query information and at least one advertisement determined, by the computer system and using the search query information, wherein each of the at least one advertisement includes a reference to an advertiser landing Web page and wherein each of the at least one advertisement advertises a product or service;

d) transmitting, by the computer system and to induce presentation on the user device, the generated document including the search results and the at least one advertisement;

e) accepting, by the computer system, a selection, sourced from the user device, of one of the at least one advertisement;

f) determining at least one supplemental advertisement, by the computer system, using
  1) the search query information, and
  2) the accepted advertiser policies including the condition that the at least one supplemental advertisement must not include any links to another document, and the condition that the at least one supplemental advertisement advertises a different product or service than the product or service advertised in the selected at least one advertisement; and g) generating, by the computer system and for presentation on the user device, the advertiser landing Web page referenced from the selected at least one advertisement, the advertiser landing Web page including the at least one supplemental advertisement determined by the computer system.

2. The computer-implemented method of claim 1 wherein the advertiser landing Web page referenced from the selected at least one advertisement includes content, and wherein the at least one supplemental advertisement is determined using at least the content of the advertiser landing Web page in addition to (1) the search query information and (2) the accepted advertiser policies.

3. The computer-implemented method of claim 1 wherein the advertiser policies accepted further include a list of one or more competitor advertisements that are not to be served.

4. The computer-implemented method of claim 1 wherein the advertiser policies accepted further include a list of one or more products or product categories to which the supplemental advertisements may not be related.

5. The computer-implemented method of claim 1 wherein the advertiser policies accepted further include a list of one or more products or product categories to which the supplemental advertisements must be related.

6. The computer-implemented method of claim 1 wherein the advertiser policies accepted further include a list of one or more services or service categories to which the supplemental advertisements may not be related.

7. The computer-implemented method of claim 1 wherein the advertiser policies accepted further include a list of one or more services or service categories to which the supplemental advertisements must be related.

8. The computer-implemented method of claim 1 wherein the advertiser policies accepted further include a condition precedent to serving the at least one supplemental advertisement.

9. The computer-implemented method of claim 1 wherein the advertiser landing Web page referenced from the selected at least one advertisement is associated with at least one topic, and wherein the at least one supplemental advertisement is determined using at least the at least one topic of the advertiser landing Web page in addition to (1) the search query information and (2) the accepted advertiser policies.

10. The computer-implemented method of claim 1 wherein the advertiser landing Web page referenced from the selected at least one advertisement is associated with at least one vertical category, and wherein the at least one supplemental advertisement is determined using at least the at least one vertical category of the advertiser landing Web page in addition (1) the search query information and (2) the accepted advertiser policies.

11. The computer-implemented method of claim 1 further comprising:

accepting, by the computer system, an election by the advertiser associated with the advertiser landing Web page to allow the at least one supplemental advertisement to be rendered with the advertiser landing Web page;

transmitting, by the computer system and to induce presentation on the user device, the advertiser landing web page referenced from the selected at least one advertisement and the at least one supplemental advertisement determined by the computer system;

providing, by the computer system, compensation to the advertiser associated with the advertiser landing page for allowing the at least one supplemental advertisement to be rendered with the advertiser landing Web page.

12. The computer-implemented method of claim 11 wherein the compensation to the advertiser is a payment.

13. The computer-implemented method of claim 11 wherein the compensation to the advertiser is an advertising network credit.

14. The computer-implemented method of claim 11 further comprising:

determining, by the computer system, a score of the selected at least one advertisement based on a degree of similarity of the selected advertisement with at least the search query information; and determining, by the computer system, a rank of the selected advertisement relative to other advertisements competing to be shown on the search results document using the determined score, wherein providing compensation to the advertiser for allowing the at least one supplemental advertisement to be rendered with the advertiser landing Web page includes increasing the determined score and the determined rank of the selected advertisement relative to other advertisements competing to be shown on the search results document.

15. Apparatus for determining at least one supplemental advertisement to be presented on an advertiser landing Web page, the advertiser landing page being referenced from a user selected advertisement, comprising:

a) one or more processors;
b) at least one input device; and
c) one or more storage devices storing processor-executable instructions which, when executed by one or more processors, perform a method of:

i) accepting advertiser policies provided by an advertiser associated with the advertiser landing Web page, the advertiser policies including 1) a condition that supplemental advertisements on the advertiser landing page must not include any links to another document, and
2) a condition that supplemental advertisements on the advertiser landing page advertise a different product or service than the product or service advertised in the user selected advertisement;

ii) accepting search query information sourced from a user device;

iii) generating, for presentation on the user device, a document with search results determined using the search query information and at least one advertisement determined using the search query information, wherein each of the at least one advertisement includes a reference to an advertiser landing Web page and wherein each of the at least one advertisement advertises a product or service;

iv) transmitting, to induce presentation on the user device, the generated document including the search results and the at least one advertisement;

v) accepting a selection, sourced from the user device, of one of the at least one advertisement;

vi) determining at least one supplemental advertisement using 1) the search query information, each of the at least one supplemental advertisement advertising a different product or service than the and
2) the accepted advertiser policies including the condition that the at least one supplemental advertisement must not include any links to another document, and the condition that the at least one supplemental advertisement advertises a different product or service than the product or service advertised in the selected at least one advertisement; and vii) generating, for presentation on the user device, the advertiser landing Web page referenced from the selected at least one advertisement, the advertiser landing Web page including the at least one supplemental advertisement determined.

16. The apparatus of claim 15 wherein the advertiser landing Web page referenced from the selected at least one advertisement includes content, and wherein the at least one supplemental advertisement is determined using at least the content of the advertiser landing Web page in addition to (1) the search query information and (2) the accepted advertiser policies.

17. The apparatus of claim 15 wherein the advertiser policies accepted further include at least one of (A) a list of one or more competitor advertisements that are not to be served, (B) a list of one or more products or product categories to which the supplemental advertisements may not be related, (C) a list of one or more products or product categories to which the supplemental advertisements must be related, (D) a list of one or more services or service categories to which the supplemental advertisements may not be related, or (E) a list of one or more services or service categories to which the supplemental advertisements must be related.

18. The apparatus of claim 15 wherein the advertiser policies accepted further include a condition precedent to serving the at least one supplemental advertisement.

19. The apparatus of claim 15 wherein the advertiser landing Web page referenced from the selected at least one advertisement is associated with at least one topic, and wherein the at least one supplemental advertisement is determined using at least the at least one topic of the advertiser landing Web page in addition to (1) the search query information and (2) the accepted advertiser policies.

20. The apparatus of claim 15 wherein the advertiser landing Web page referenced from the selected at least one advertisement is associated with at least one vertical category, and wherein the at least one supplemental advertisement is determined using at least the at least one vertical category of the advertiser landing Web page in addition (1) the search query information and (2) the accepted advertiser policies.

21. The apparatus of claim 15 wherein the processor-executable instructions which, when executed by one or more processors, further perform:

accepting an election by the advertiser associated with the advertiser landing Web page to allow the at least one supplemental advertisement to be rendered with the advertiser landing Web page;

transmitting to induce presentation on the user device, the advertiser landing Web page referenced from the selected at least one advertisement and the at least one supplemental advertisement determined by the computer system;

providing compensation to the advertiser associated with the advertiser landing page for allowing the at least one supplemental advertisement to be rendered with the advertiser landing Web page.

22. The apparatus of claim 21 wherein the compensation to the advertiser is at least one of (A) a payment, or (B) an advertising network credit.

23. The apparatus of claim 21 wherein the processor-executable instructions which, when executed by one or more processors, further perform:

determining a score of the selected at least one advertisement based on a degree of similarity of the selected advertisement with at least the search query information; and determining a rank of the selected advertisement relative to other advertisements competing to be shown on the search results document using the determined score, wherein providing compensation to the advertiser for allowing the at least one supplemental advertisement to be rendered with the advertiser landing Web page includes increasing the determined score and the determined rank of the selected advertisement relative to other advertisements competing to be shown on the search results document.

\* \* \* \* \*